(12) United States Patent
Rached

(10) Patent No.: US 9,133,379 B2
(45) Date of Patent: *Sep. 15, 2015

(54) BINARY REFRIGERATING FLUID

(75) Inventor: Wissam Rached, Chaponost (FR)

(73) Assignee: ARKEMA FRANCE, Colombes (FR)

(*) Notice: Subject to any disclaimer, the term of this patent is extended or adjusted under 35 U.S.C. 154(b) by 158 days.

This patent is subject to a terminal disclaimer.

(21) Appl. No.: 13/391,400

(22) PCT Filed: Aug. 17, 2010

(86) PCT No.: PCT/FR2010/051724
§ 371 (c)(1),
(2), (4) Date: Feb. 29, 2012

(87) PCT Pub. No.: WO2011/030026
PCT Pub. Date: Mar. 17, 2011

(65) Prior Publication Data
US 2012/0151959 A1  Jun. 21, 2012

(30) Foreign Application Priority Data

Sep. 11, 2009 (FR) ...................................... 09 56240

(51) Int. Cl.
C09K 5/04 (2006.01)
F25B 9/00 (2006.01)

(52) U.S. Cl.
CPC ............ *C09K 5/045* (2013.01); *C09K 2205/126* (2013.01); *C09K 2205/22* (2013.01); *F25B 9/006* (2013.01)

(58) Field of Classification Search
CPC ........ C09K 5/045; C09K 2205/22; F25B 1/00
USPC ........................................ 252/67, 68; 62/115
See application file for complete search history.

(56) References Cited

U.S. PATENT DOCUMENTS

| | | | |
|---|---|---|---|
| 6,176,102 B1 | 1/2001 | Novak et al. | |
| 8,070,977 B2 | 12/2011 | Rached | |
| 8,075,798 B2 | 12/2011 | Rached | |
| 8,246,850 B2 * | 8/2012 | Rached | 252/67 |
| 8,252,198 B2 * | 8/2012 | Rached | 252/67 |
| 8,557,135 B2 | 10/2013 | Rached | |
| 8,808,569 B2 | 8/2014 | Rached | |
| 8,858,824 B2 | 10/2014 | Boussand | |
| 8,858,825 B2 | 10/2014 | Guerin et al. | |
| 8,992,793 B2 * | 3/2015 | Sato et al. | 252/68 |
| 9,011,711 B2 * | 4/2015 | Rached | 252/67 |
| 2006/0243944 A1 | 11/2006 | Minor et al. | |
| 2007/0069175 A1 * | 3/2007 | Thomas et al. | 252/68 |
| 2008/0184731 A1 | 8/2008 | Sienel et al. | |
| 2008/0230738 A1 * | 9/2008 | Minor et al. | 252/67 |
| 2008/0314073 A1 | 12/2008 | Minor | |
| 2009/0120619 A1 * | 5/2009 | Sievert et al. | 165/104.27 |
| 2009/0267019 A1 * | 10/2009 | Motta et al. | 252/68 |
| 2009/0314015 A1 | 12/2009 | Minor et al. | |
| 2010/0044619 A1 | 2/2010 | Hulse et al. | |
| 2010/0186432 A1 * | 7/2010 | Perti et al. | 62/115 |
| 2010/0319377 A1 | 12/2010 | Moriwaki et al. | |
| 2010/0326129 A1 | 12/2010 | Moriwaki et al. | |
| 2011/0084228 A1 | 4/2011 | Rached | |
| 2011/0095224 A1 | 4/2011 | Rached | |
| 2011/0186772 A1 | 8/2011 | Rached | |
| 2011/0219791 A1 | 9/2011 | Rached | |
| 2011/0219792 A1 | 9/2011 | Rached | |
| 2011/0240254 A1 | 10/2011 | Rached | |
| 2011/0284181 A1 | 11/2011 | Rached | |
| 2012/0049104 A1 | 3/2012 | Rached | |
| 2012/0056123 A1 | 3/2012 | Rached | |
| 2012/0068105 A1 | 3/2012 | Rached et al. | |
| 2012/0097885 A9 | 4/2012 | Hulse et al. | |
| 2012/0144857 A1 * | 6/2012 | Rached | 62/502 |
| 2012/0151958 A1 | 6/2012 | Rached | |
| 2012/0153213 A1 * | 6/2012 | Rached | 252/67 |
| 2012/0159982 A1 * | 6/2012 | Rached | 62/468 |
| 2012/0161064 A1 | 6/2012 | Rached | |
| 2012/0167615 A1 * | 7/2012 | Rached | 62/468 |
| 2012/0205574 A1 | 8/2012 | Rached et al. | |
| 2012/0255316 A1 * | 10/2012 | Andre et al. | 62/98 |
| 2013/0055733 A1 * | 3/2013 | Rached | 62/77 |
| 2013/0055738 A1 * | 3/2013 | Rached | 62/114 |
| 2013/0092869 A1 | 4/2013 | Boussand | |
| 2013/0096218 A1 * | 4/2013 | Rached et al. | 521/170 |
| 2013/0105724 A1 | 5/2013 | Boussand | |
| 2013/0186114 A1 | 7/2013 | Guerin et al. | |
| 2014/0008565 A1 | 1/2014 | Rached et al. | |

(Continued)

FOREIGN PATENT DOCUMENTS

EP  2 149 592 A2  2/2010
EP  2 249 104 A1  11/2010

(Continued)

OTHER PUBLICATIONS

CAS Reg. No. 754-12-1, Nov. 16, 1984.*
CAS Reg. No. 75-10-5, Nov. 16, 1984.*
International Search Report issued in PCT/FR2010/051724, mailed Jan. 21, 2011, EPO, Rijswijk, NL, 6 pages (English/French language versions).
Boussand, Béatrice, U.S. Appl. No. 14/371,118 entitled "Heat Transfer Compositions Having Improved Miscibility With Lubricating Oil," filed in the U.S. Patent and Trademark Office on Jul. 8, 2014.
Rached, Wissam, U.S. Appl. No. 14/615,741 entitled "Heat Transfer Fluid Replacing R-410A," filed in the U.S. Patent and Trademark Office on Feb. 6, 2015.
Rached, Wissam, U.S. Appl. No. 14/615,780 entitled "Low-Temperature and Average-Temerature Refrigeration," filed in the U.S. Patent and Trademark Office on Feb. 6, 2015.

*Primary Examiner* — Douglas McGinty
(74) *Attorney, Agent, or Firm* — Buchanan Ingersoll & Rooney P.C.

(57) ABSTRACT

The invention relates to binary compositions of 2,3,3,3-tetrafluoropropene and difluoromethane, and especially to the uses thereof as a heat transfer fluid in compression systems with exchangers operating in counterflow mode or in split flow mode with counterflow tendency. The invention also relates to a heat transfer method.

11 Claims, No Drawings

(56) References Cited

U.S. PATENT DOCUMENTS

| | | |
|---|---|---|
| 2014/0075969 A1 | 3/2014 | Guerin et al. |
| 2014/0166923 A1 | 6/2014 | Motta et al. |
| 2014/0318160 A1 | 10/2014 | Rached |
| 2014/0326017 A1 | 11/2014 | Rached |
| 2015/0027146 A1 | 1/2015 | Boussand |
| 2015/0076393 A1* | 3/2015 | Saito et al. .................. 252/68 |

FOREIGN PATENT DOCUMENTS

| | | |
|---|---|---|
| FR | 2.182.956 | 12/1973 |
| FR | 2256381 A | 7/1975 |
| JP | 4-110388 | 4/1992 |
| JP | 4110388 | 4/1992 |
| JP | 2008-531836 A | 8/2008 |
| JP | 2009-222362 A | 10/2009 |
| JP | 2009-228984 A | 10/2009 |
| JP | 2009-257601 A | 11/2009 |
| JP | 2009-257655 A | 11/2009 |
| JP | 2010-002074 A | 1/2010 |
| JP | 2010-047754 A | 3/2010 |
| RU | 2 189 544 C2 | 9/2002 |
| WO | WO 2004/037913 A2 | 5/2004 |
| WO | WO 2005/105947 A2 | 11/2005 |
| WO | WO 2005/105947 A3 | 11/2005 |
| WO | WO 2006/094303 A2 | 9/2006 |
| WO | WO 2006/101563 A2 | 9/2006 |
| WO | WO 2006/101563 A3 | 9/2006 |
| WO | WO 2007/126414 A2 | 11/2007 |
| WO | WO 2007/126414 A3 | 11/2007 |
| WO | WO 2008/027555 A2 | 3/2008 |
| WO | WO 2008/027555 A3 | 3/2008 |
| WO | WO 2009/107364 A1 | 9/2009 |
| WO | WO 2009/110228 A1 | 9/2009 |
| WO | WO 2010/000993 A2 | 1/2010 |
| WO | WO 2010/000993 A3 | 1/2010 |
| WO | WO 2010/000994 A2 | 1/2010 |
| WO | WO 2010/000994 A3 | 1/2010 |
| WO | WO 2010/002016 A1 | 1/2010 |
| WO | WO 2010002023 A1 * | 1/2010 |
| WO | WO 2010040928 A1 * | 4/2010 |
| WO | WO 2010061084 A1 * | 6/2010 |

* cited by examiner

BINARY REFRIGERATING FLUID

FIELD OF THE INVENTION

The present invention relates to binary compositions of 2,3,3,3-tetrafluoropropene and difluoromethane and their uses as heat transfer fluids.

BACKGROUND OF THE INVENTION

The problems posed by substances with ozone depletion potential (ODP) were discussed in Montreal, where the protocol was signed requiring a reduction of the production and use of chlorofluorocarbons (CFCs). Amendments have been made to this protocol, requiring abandonment of CFCs and extending the regulations to cover other products, including hydrochlorofluorocarbons (HCFCs).

The refrigeration and air conditioning industry has made a considerable investment in substitution of these refrigerants, and accordingly hydrofluorocarbons (HFCs) were put on the market.

In the automobile industry, the systems for air conditioning of vehicles marketed in many countries have changed over from a chlorofluorocarbon refrigerant (CFC-12) to a hydrofluorocarbon refrigerant (1,1,1,2-tetrafluoroethane: HFC-134a), which is less harmful to the ozone layer. However, with respect to the objectives established by the Kyoto protocol, HFC-134a (GWP=1300) is considered to have a high warming power. A fluid's contribution to the greenhouse effect is quantified by a criterion, GWP (Global Warming Potential), which summarizes the warming power by taking a reference value of 1 for carbon dioxide.

As carbon dioxide is nontoxic, nonflammable and has a very low GWP, it has been proposed as a refrigerant for air conditioning systems in place of HFC-134a. However, the use of carbon dioxide has several drawbacks, notably connected with the very high pressure for its application as refrigerant in existing equipment and technologies.

Moreover, the mixture R-404A consisting of 44 wt. % of pentafluoroethane, 52 wt. % of trifluoroethane and 4 wt. % of HFC-134a is widely used as refrigerant for large areas (supermarkets) and in refrigerated transport. However, this mixture has a GWP of 3900.

Document JP 4110388 describes the use of hydrofluoropropenes of formula $C_3H_mF_n$, with m, n representing an integer between 1 and 5 inclusive and m+n=6, as heat transfer fluids, in particular tetrafluoropropene and trifluoropropene.

Document WO2004/037913 discloses the use of compositions comprising at least one fluoroalkene having three or four carbon atoms, notably pentafluoropropene and tetrafluoropropene, preferably having a GWP of at most 150, as heat transfer fluids.

Document WO 2006/094303 discloses an azeotropic composition containing 7.4 wt. % of 2,3,3,3-tetrafluoropropene (HFO-1234yf) and 92.6 wt. % of difluoromethane (HFC-32). This document also discloses quasi-azeotropic compositions containing from 1 to 57 wt. % of 2,3,3,3-tetrafluoropropene and from 43 to 99 wt. % of difluoromethane.

A heat exchanger is a device for transferring thermal energy from one fluid to another, without mixing them. The thermal flux passes through the exchange surface that separates the fluids. Mostly this method is used for cooling or heating a liquid or a gas that cannot be cooled or heated directly.

In compression systems, heat exchange between the refrigerant and the heat sources takes place via heat-transfer fluids. These heat-transfer fluids are in the gaseous state (the air in air conditioning and direct-expansion refrigeration), liquid (water in domestic heat pumps, glycol solution) or two-phase.

There are various transfer modes:
- the two fluids are arranged in parallel and go in the same sense: co-current mode (antimethodical);
- the two fluids are arranged in parallel but go in the opposite sense: countercurrent mode (methodical);
- the two fluids are positioned perpendicularly: crossed-current mode. The crossed current can have co-current or countercurrent tendency;
- one of the two fluids makes a U-turn in a wider pipeline, which the second fluid passes through. This configuration is comparable to a co-current exchanger on half its length, and to a countercurrent exchanger for the other half: pin-head mode.

DETAILED DESCRIPTION OF THE INVENTION

The applicant has now discovered that binary compositions of 2,3,3,3-tetrafluoropropene and difluoromethane are particularly advantageous as heat transfer fluid in compression-type refrigeration systems with exchangers operating in countercurrent mode or in crossed-current mode with countercurrent tendency.

Thus, these compositions can be used as heat transfer fluid in heat pumps, optionally reversible, up to a heating temperature of 95° C., in air conditioning, industrial air conditioning (paper, rooms for servers), in mobile domestic air conditioning, in domestic refrigeration and freezing, employing compression systems with exchangers in countercurrent mode or in crossed-current mode with countercurrent tendency.

Thus, a first object of the present invention relates to the use of binary compositions of 2,3,3,3-tetrafluoropropene and difluoromethane as heat transfer fluid in compression-type refrigeration systems with exchangers in countercurrent mode or in crossed-current mode with countercurrent tendency.

Preferably, binary compositions of 2,3,3,3-tetrafluoropropene and difluoromethane are used as heat transfer fluid for air conditioning and heat pumps, with exchangers in countercurrent mode or in crossed-current mode with countercurrent tendency.

The binary compositions of 2,3,3,3-tetrafluoropropene and difluoromethane are preferably zeotropic and contain essentially from 70 to 90 wt. % of 2,3,3,3-tetrafluoropropene and from 10 to 30 wt. % of difluoromethane.

Preferably, the zeotropic compositions contain essentially from 78 to 84 wt. % of 2,3,3,3-tetrafluoropropene and from 16 to 22 wt. % of difluoromethane.

The advantageously preferred zeotropic compositions contain essentially from 81 to 83 wt. % of 2,3,3,3-tetrafluoropropene and from 17 to 19 wt. % of difluoromethane.

The binary compositions used in the present invention have both a zero ODP and a low GWP. Their high critical temperature (>90° C.) means that they can be used in extreme conditions, namely very high ambient temperatures or for producing heat at high temperature (in heat pumps). The coefficient of performance (COP: the ratio of the thermal power to the electricity consumption of a heat pump or of an air conditioner) of these binary compositions, in exchangers in countercurrent mode, is higher than that of existing refrigerant compositions. Taking into account the pressure level at the condenser and the compression ratios, it is not necessary to develop new compressors; the compressors currently on the market may be suitable.

The binary compositions used in the present invention can replace R-404A and R-407C (ternary mixture containing 52 wt. % of HFC-134a, 25 wt. % of pentafluoroethane and 23 wt. % of difluoromethane) in compression-type heat-transfer systems with exchangers operating in countercurrent mode or in crossed-current mode with countercurrent tendency.

Moreover, binary zeotropic compositions can be used in compression systems equipped with a device for varying the composition by controlled distillation. Such a device makes it possible to improve efficiency and reduce losses during compressor starting and stopping.

The binary compositions used according to the present invention can be stabilized. The amount of stabilizer preferably represents at most 5 wt. % relative to the binary composition.

As stabilizers, we may notably mention nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (alkyl optionally fluorinated or perfluorinated or alkenyl or aromatic) such as n-butyl glycidyl ether, hexanediol diglycidyl ether, ally glycidyl ether, butylphenylglycidyl ether, phosphites, phosphates, phosphonates, thiols and lactones.

A second object of the present invention relates to a method of heat transfer in which binary compositions of 2,3,3,3-tetrafluoropropene and difluoromethane, as defined above, are used as refrigerant in compression systems using exchangers in countercurrent mode or in crossed-current mode with countercurrent tendency. The method according to the present invention can be employed in the presence of lubricants such as mineral oil, alkylbenzene, polyalkylene glycol, polyol ester and polyvinyl ether.

A third object of the present invention relates to a binary composition containing essentially 78 to 84 wt. % of 2,3,3,3-tetrafluoropropene and from 16 to 22 wt. % of difluoromethane.

The binary composition preferred according to the third object contains essentially from 81 to 83 wt. % of 2,3,3,3-tetrafluoropropene and from 17 to 19 wt. % of difluoromethane.

The binary compositions, according to the third object of the present invention, can be stabilized. The amount of stabilizer preferably represents at most 5 wt. % relative to the binary composition.

The stabilizer can be selected from those mentioned above.

The composition according to the third object can be used as heat transfer fluid.

A fourth object according to the present invention relates to a composition comprising the binary composition according to the third object, optionally stabilized, and at least one lubricant. The lubricant can be selected from mineral oil, alkylbenzene, polyalkylene glycol, polyol ester and polyvinyl ether.

EXPERIMENTAL SECTION

Tools for Calculation

The RK-Soave equation is used for calculating the densities, enthalpies, entropies and the data on liquid-vapor equilibrium of the mixtures. To use this equation it is necessary to know the properties of the pure substances used in the mixtures in question as well as the coefficients of interaction for each binary mixture.

The data required for each pure substance are:

Boiling point, critical temperature and pressure, curve of pressure as a function of temperature from the boiling point to the critical point, the saturated liquid density and saturated vapor density as a function of temperature.

HFC-32:

The data for HFC-32 are published in ASHRAE Handbook 2005 chapter 20 and are also available using Refrop (software developed by NIST for calculating the properties of refrigerants)

HFO-1234yf:

The data of the temperature-pressure curve of HFO-1234yf are measured by the static method. The critical temperature and pressure are measured with a C80 calorimeter marketed by Setaram. The densities, at saturation as a function of temperature, are measured by the vibrating tube densimeter technology developed by the laboratories of the Ecole de Mines ("Mining Engineering College") in Paris.

Coefficient of Binary Interaction of HFC-32/HFO-1234yf:

The RK-Soave equation uses coefficients of binary interaction for representing the behavior of the products in mixtures. The coefficients are calculated as a function of experimental data for liquid-vapor equilibrium.

The technique used for the measurements of liquid-vapor equilibrium is the static analytical cell method. The equilibrium cell comprises a sapphire tube and is equipped with two ROLSI™ electromagnetic samplers. It is immersed in a cryo-thermostat bath (HUBER HS40). Magnetic stirring driven by a field rotating at variable speed is used for accelerating attainment of the equilibria. The samples are analyzed by gas chromatography (HP5890 series II) using a catharometer (TCD).

The measurements of liquid-vapor equilibrium on the HFC-32/HFO-1234yf binary mixture are performed for the following isotherms: −10° C., 30° C. and 70° C.

Compression System

Consider a compression system equipped with an evaporator and countercurrent condenser, a screw compressor and a pressure reducing valve.

The system operates with 15° C. of superheating and 5° C. of supercooling. The minimum temperature difference between the secondary fluid and the refrigerant is considered to be of the order of 5° C.

The isentropic efficiency of the compressors is a function of the compression ratio. This efficiency is calculated from the following equation:

$$\eta_{isen} = a - b(\tau - c)^2 - \frac{d}{\tau - e} \tag{1}$$

For a screw compressor, the constants a, b, c, d and e in equation (1) of isentropic efficiency are calculated on the basis of the standard data published in the Handbook "Handbook of air conditioning and refrigeration", page 11.52.

The coefficient of performance (COP) is defined as the ratio of the useful power delivered by the system to the power supplied to or consumed by the system.

The Lorenz coefficient of performance (COPLorenz) is a reference coefficient of performance. It is a function of temperature and is used for comparing the COPs of different fluids.

The Lorenz coefficient of performance is defined as follows:

(The temperatures T are in K)

$$T_{mean}^{condenser} = T_{inlet}^{condenser} - T_{outlet}^{condenser} \tag{2}$$

$$T_{mean}^{evaporator} = T_{outlet}^{evaporator} - T_{inlet}^{evaporator} \tag{3}$$

The Lorenz COP in the case of air conditioning and refrigeration is:

$$COPlorenz = \frac{T_{mean}^{evaporator}}{T_{mean}^{condenser} - T_{mean}^{evaporator}} \tag{4}$$

The Lorenz COP in the case of heating is:

$$COPlorenz = \frac{T_{mean}^{condenser}}{T_{mean}^{condenser} - T_{mean}^{evaporator}} \quad (5)$$

For each composition, the coefficient of performance of the Lorenz cycle is calculated as a function of the corresponding temperatures.

% COP/COPLorenz is the ratio of the COP of the system relative to the COP of the corresponding Lorenz cycle.

Results, Heating Mode

In heating mode, the compression system operates between a refrigerant inlet temperature at the evaporator of −5° C. and a refrigerant inlet temperature at the condenser of 50° C. The system delivers heat at 45° C.

The performance of the compositions according to the invention in heat pump operating conditions are given in Table 1. The values of the constituents (HFO-1234yf, HFC-32) for each composition are given as percentage by weight.

TABLE 1

| R404A | | Temp outlet evap (° C.) | Temp outlet comp (° C.) | T outlet cond (° C.) | evap P (bar) | cond P (bar) | Ratio (w/w) | Shift | efficiency comp | % COP/COPLorenz |
|---|---|---|---|---|---|---|---|---|---|---|
| HFO-1234yf | HFC-32 | | | | | | | | | |
| | | −5 | 77 | 50 | 5.2 | 23.0 | 4.4 | 0.38 | 79.7 | 57.7 |
| 85 | 15 | 0 | 76 | 43 | 4.0 | 16.5 | 4.1 | 4.84 | 80.6 | 64.7 |
| 84 | 16 | 0 | 77 | 43 | 4.1 | 16.7 | 4.1 | 5.01 | 80.7 | 64.7 |
| 83 | 17 | 0 | 77 | 43 | 4.2 | 17.0 | 4.1 | 5.16 | 80.7 | 64.7 |
| 82 | 18 | 0 | 78 | 43 | 4.2 | 17.2 | 4.1 | 5.29 | 80.8 | 64.7 |
| 81 | 19 | 0 | 78 | 43 | 4.3 | 17.5 | 4.1 | 5.39 | 80.8 | 64.7 |
| 80 | 20 | 0 | 79 | 43 | 4.4 | 17.7 | 4.0 | 5.48 | 80.8 | 64.7 |
| 79 | 21 | 1 | 80 | 43 | 4.5 | 18.0 | 4.0 | 5.54 | 80.9 | 64.7 |
| 78 | 22 | 1 | 80 | 43 | 4.5 | 18.2 | 4.0 | 5.59 | 80.9 | 64.7 |

Results, Cooling Mode

In cooling mode, the compression system operates between a refrigerant inlet temperature at the evaporator of −5° C. and a refrigerant inlet temperature at the condenser of 50° C. The system delivers cold at 0° C.

The performance of the compositions according to the invention in the operating conditions of cooling are given in Table 2. The values of the constituents (HFO-1234yf, HFC-32) for each composition are given as percentage by weight.

TABLE 2

| R404A | | Temp outlet evap (° C.) | Temp outlet comp (° C.) | T outlet cond (° C.) | evap P (bar) | cond P (bar) | Ratio (w/w) | Shift | efficiency comp | % COP/COPLorenz |
|---|---|---|---|---|---|---|---|---|---|---|
| HFO-1234yf | HFC-32 | | | | | | | | | |
| | | −5 | 77 | 50 | 5.2 | 23.0 | 4.4 | 0.38 | 79.7 | 47.9 |
| 88 | 12 | −1 | 75 | 44 | 3.7 | 15.7 | 4.2 | 4.20 | 80.3 | 55.9 |
| 87 | 13 | −1 | 75 | 43 | 3.8 | 16.0 | 4.2 | 4.44 | 80.4 | 56.0 |
| 86 | 14 | 0 | 76 | 43 | 3.9 | 16.2 | 4.2 | 4.65 | 80.5 | 56.2 |
| 85 | 15 | 0 | 76 | 43 | 4.0 | 16.5 | 4.1 | 4.84 | 80.6 | 56.3 |
| 84 | 16 | 0 | 77 | 43 | 4.1 | 16.7 | 4.1 | 5.01 | 80.7 | 56.4 |
| 83 | 17 | 0 | 77 | 43 | 4.2 | 17.0 | 4.1 | 5.16 | 80.7 | 56.4 |
| 82 | 18 | 0 | 78 | 43 | 4.2 | 17.2 | 4.1 | 5.29 | 80.8 | 56.5 |
| 81 | 19 | 0 | 78 | 43 | 4.3 | 17.5 | 4.1 | 5.39 | 80.8 | 56.5 |
| 80 | 20 | 0 | 79 | 43 | 4.4 | 17.7 | 4.0 | 5.48 | 80.8 | 56.5 |
| 79 | 21 | 1 | 80 | 43 | 4.5 | 18.0 | 4.0 | 5.54 | 80.9 | 56.6 |
| 78 | 22 | 1 | 80 | 43 | 4.5 | 18.2 | 4.0 | 5.59 | 80.9 | 56.6 |

The invention claimed is:

1. A heat transfer system comprising a compression system with exchangers operating in countercurrent flow mode or in crossed-current flow mode with countercurrent tendency and a refrigerant comprising from 70 to 90 wt. % of 2,3,3,3-tetrafluoropropene and from 10 to 30 wt. % of difluoromethane.

2. The heat transfer system as claimed in claim 1, wherein the refrigerant consists of from 70 to 90 wt. % of 2,3,3,3-tetrafluoropropene, from 10 to 30 wt. % of difluoromethane, optionally, a stabilizer, and optionally, a lubricant.

3. The heat transfer system as claimed in claim 1, wherein the refrigerant consists of from 78 to 84 wt. % of 2,3,3,3-tetrafluoropropene, from 16 to 22 wt. % of difluoromethane, optionally, a stabilizer, and optionally, a lubricant.

4. The heat transfer system as claimed in claim 1, wherein the refrigerant further comprises a stabilizer.

5. The heat transfer system as claimed in claim 1, wherein said refrigerant further comprises a lubricant.

6. A composition consisting essentially of from 81 to 83 wt. % of 2,3,3,3-tetrafluoropropene and from 17 to 19 wt. % of difluoromethane.

7. A composition consisting of from 81 to 83 wt. % of 2,3,3,3-tetrafluoropropene, from 17 to 19 wt. % of difluoromethane, optionally, a stabilizer, and optionally, a lubricant.

8. A heat transfer system comprising a compression system with exchangers operating in countercurrent flow mode or in crossed-current flow mode with countercurrent tendency and a refrigerant consisting essentially of from 78 to 84 wt. % of 2,3,3,3-tetrafluoropropene and from 16 to 22 wt. % of difluoromethane.

9. The heat transfer system according to claim 8, wherein the refrigerant consists essentially of from 81 to 83 wt. % of 2,3,3,3-tetrafluoropropene and from 17 to 19 wt. % of difluoromethane.

10. The heat transfer system according to claim 8, wherein the refrigerant consists of from 78 to 84 wt. % of 2,3,3,3-tetrafluoropropene, from 16 to 22 wt. % of difluoromethane, optionally a lubricant, and optionally, a stabilizer.

11. The heat transfer system according to claim 8, wherein the refrigerant consists of from 81 to 83 wt. % of 2,3,3,3-tetrafluoropropene, from 17 to 19 wt. % of difluoromethane, optionally, a stabilizer, and optionally, a lubricant.

* * * * *